United States Patent
Kim et al.

(10) Patent No.: US 12,448,501 B2
(45) Date of Patent: *Oct. 21, 2025

(54) RUBBER COMPOSITION FOR TIRE TREAD AND MANUFACTURING METHOD THEREOF

(71) Applicant: KOREA KUMHO PETROCHEMICAL CO., LTD., Seoul (KR)

(72) Inventors: Jae-Yun Kim, Daejeon (KR); Dong Eun Kang, Daejeon (KR); Junhoo Park, Daejeon (KR)

(73) Assignee: KOREA KUMHO PETROCHEMICAL CO., LTD., Seoul (KR)

( * ) Notice: Subject to any disclaimer, the term of this patent is extended or adjusted under 35 U.S.C. 154(b) by 477 days.

This patent is subject to a terminal disclaimer.

(21) Appl. No.: 17/942,649

(22) Filed: Sep. 12, 2022

(65) Prior Publication Data
US 2023/0098008 A1    Mar. 30, 2023

(30) Foreign Application Priority Data
Sep. 13, 2021   (KR) .................. 10-2021-0121830

(51) Int. Cl.
*C08L 9/06* (2006.01)
*B60C 1/00* (2006.01)

(52) U.S. Cl.
CPC .............. *C08L 9/06* (2013.01); *B60C 1/0016* (2013.01); *C08L 2205/03* (2013.01)

(58) Field of Classification Search
CPC ...... C08L 9/06; C08L 2205/03; B60C 1/0016; Y02T 10/86
See application file for complete search history.

(56) References Cited

U.S. PATENT DOCUMENTS

2013/0036940 A1* 2/2013 Tanaka ................ C08K 9/06
                                                    556/420
2019/0136019 A1* 5/2019 Kushida ............. C08K 5/548

* cited by examiner

*Primary Examiner* — Doris L Lee
(74) *Attorney, Agent, or Firm* — Sughrue Mion, PLLC

(57) ABSTRACT

An embodiment of the present specification provides a rubber composition for a tire tread, comprising: a rubber polymer; a petroleum resin; and a functionalized processing aid, wherein the functionalized processing aid is a bond of a silane-based compound and a cardanol-derived structure, represented by the following formula 1:

$(R_1)_3Si-R_2-Z-(E)_n$      [Formula 1]

wherein $R_1$, $R_2$, Z, E and n are as defined in the specification, and a method of manufacturing the same.

5 Claims, 1 Drawing Sheet

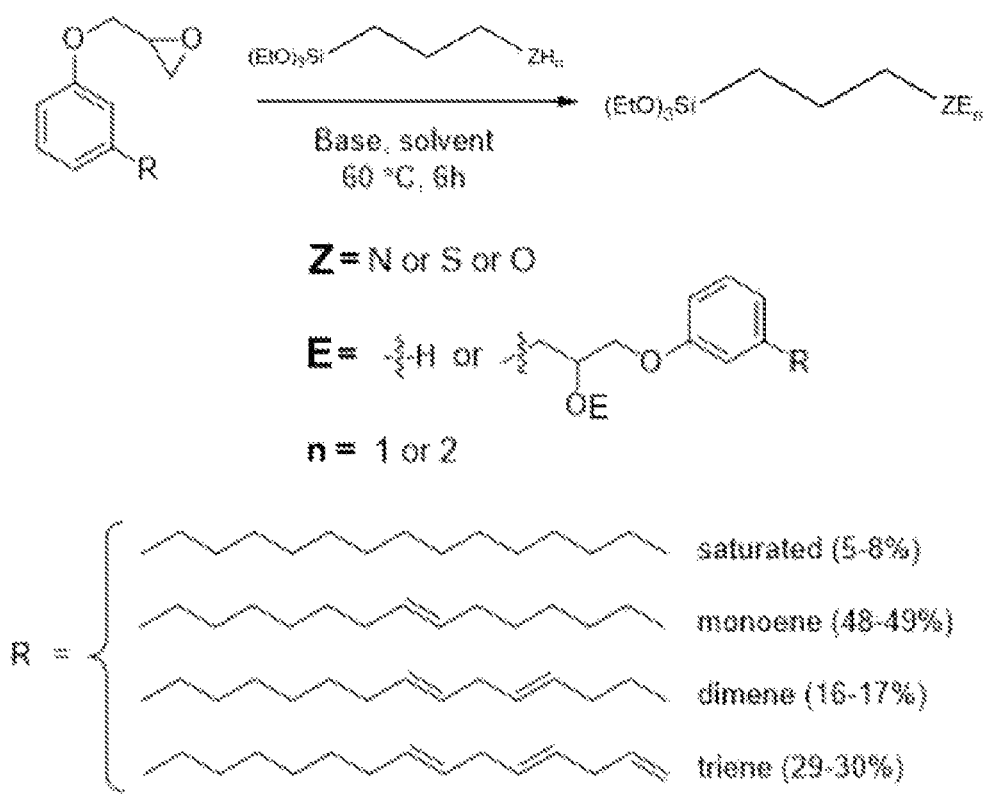

RUBBER COMPOSITION FOR TIRE TREAD AND MANUFACTURING METHOD THEREOF

TECHNICAL FIELD

The present specification relates to a rubber composition for a tire tread and a method of manufacturing the same. More specifically, the present specification relates to a rubber composition for a tire tread comprising a petroleum resin and a functionalized processing aid.

BACKGROUND ART

Braking performance is one of the most important factors among the performance of tires used in vehicles. Such braking performance is directly related to safety, and at the same time, directly affects the driving performance of a vehicle. Recently, as the performance of passenger cars has improved, the consumer's demand for high-performance tires suitable therefor is on the increase. In addition, the demand for low fuel consumption and low abrasion performance is rapidly increasing to protect the environment and resources.

Rubber products such as tires are manufactured by compounding various additives in addition to rubber. During this rubber compounding process, processing aids such as extender oils and processing oils are added to improve moldability and processability and to reduce the load of the compounding machine.

Conventional extender oils have problems such that volatile organic compounds (VOCs) are generated in excess in the compounding and vulcanizing steps due to the low molecular weight of the material itself. In addition, the extender oil moves to the surface without bonding with the rubber composition inside the tire, which is the final product, causing migration and blooming that causes spots on the exterior of the tire. Further, the physical properties change easily under high temperature and aging conditions, degrading the tire performance under severe conditions such as driving at high speed.

In order to improve the degradation of performance caused by the extender oil, a method of improving the braking performance of tires by replacing part of the extender oil with a petroleum resin or additionally adding a petroleum resin when compounding the rubber for tire treads has been suggested. However, when using a petroleum resin, there is a problem that the rolling resistance performance and dispersibility of the filler used as a reinforcing agent deteriorate, and the processability deteriorates during the rubber compounding process due to the high viscosity. Therefore, in order to solve the above problems, additional improvement of physical properties is required.

SUMMARY OF INVENTION

Technical Task

The description of the present specification is intended to solve the problems of the prior art described above, and it is an object of the present specification to provide a rubber composition for a tire tread with improved dispersibility of a reinforcing agent, thereby exhibiting excellent mechanical and dynamic properties and excellent processability, and a method of manufacturing the same.

Means for Solving Technical Task

According to an aspect, the present specification provides a rubber composition for a tire tread, comprising: a rubber polymer; a petroleum resin; and a functionalized processing aid, wherein the functionalized processing aid is a bond of a silane-based compound and a cardanol-derived structure, represented by the following formula 1:

$$(R_1)_3Si\text{—}R_2\text{—}Z\text{-}(E)_n \quad \text{[Formula 1]}$$

wherein $R_1$ is each independently a linear or branched alkyl group or alkoxyalkyl group having 1 to 10 carbon atoms, $R_2$ is a linear or branched alkylene group having 1 to 20 carbon atoms, Z is nitrogen, sulfur or oxygen, and E is each independently hydrogen or a cardanol-derived structure represented by the following formula 1-1:

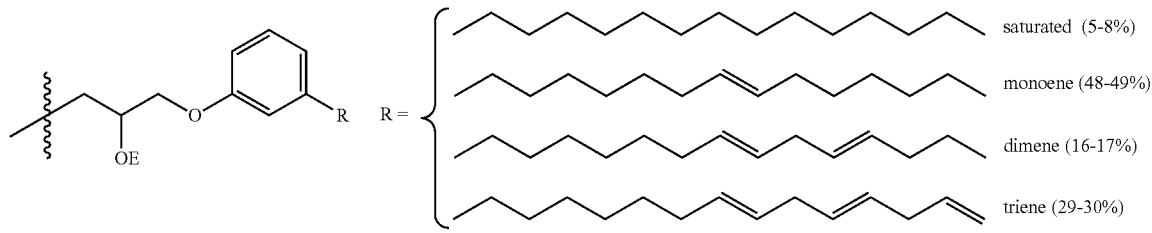

[Formula 1-1]

wherein at least one E is not hydrogen, and n is 1 or 2.

In an embodiment, the rubber polymer may comprise at least one of a first polymer in which an aromatic vinyl monomer and a conjugated diene-based monomer are solution-polymerized and a second polymer in which a conjugated diene-based monomer is solution-polymerized.

In an embodiment, the petroleum resin may be at least one selected from the group consisting of phenolic resin, a coumarone indene resin, an alpha-methylstyrene resin, a C5/C9 mixed petroleum resin, a C9 petroleum resin, a dicyclopentadiene resin and a hydrogenated dicyclopentadiene resin.

In an embodiment, the content of the petroleum resin may be 5 to 50 parts by weight based on 100 parts by weight of the rubber polymer.

In an embodiment, the content of the functionalized processing aid may be 1 to 20 parts by weight based on 100 parts by weight of the rubber polymer.

In an embodiment, the molar ratio of the silane-based compound and the cardanol-derived structure may be 1:2 to 8.

According to another aspect, the present specification provides a method of manufacturing a rubber composition for a tire tread, comprising: (a) preparing a rubber polymer by solution-polymerizing a monomer mixture comprising a conjugated diene-based monomer; and (b) adding a petroleum resin and a functionalized processing aid to the rubber polymer and mixing the same, wherein the functionalized processing aid is a bond of a silane-based compound and a cardanol-derived structure, represented by the following formula 1:

$$(R_1)_3Si-R_2-Z-(E)_n \quad \text{[Formula 1]}$$

wherein $R_1$ is each independently a linear or branched alkyl group or alkoxyalkyl group having 1 to 10 carbon atoms, $R_2$ is a linear or branched alkylene group having 1 to 20 carbon atoms, Z is nitrogen, sulfur or oxygen, and E is each independently hydrogen or a cardanol-derived structure represented by the following formula 1-1:

[Formula 1-1]

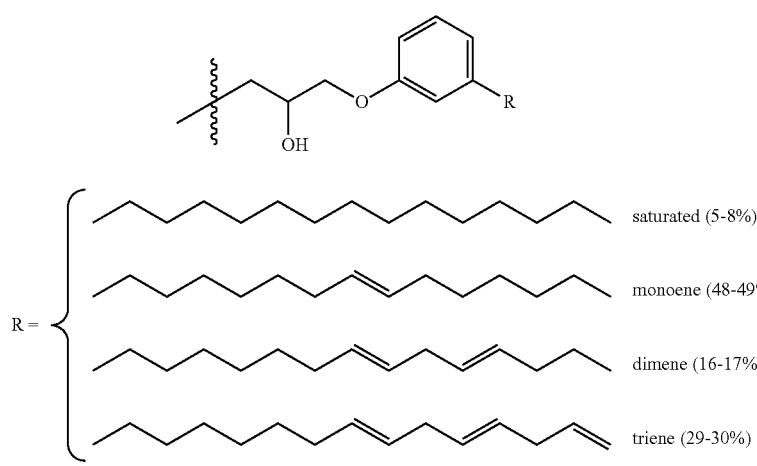

wherein at least one E is not hydrogen, and n is 1 or 2.

In an embodiment, the functionalized processing aid may be manufactured by reacting a mixture of a silane-based compound, an epoxidized cardanol and a solvent in the presence of a base.

Effect of Invention

According to an aspect of the present specification, a rubber composition for a tire tread with improved dispersibility of a reinforcing agent, thereby exhibiting excellent mechanical and dynamic properties and excellent processability may be manufactured.

Also, according to another aspect of the present specification, a rubber composition for a tire tread may be applied to the manufacturing of a tire having excellent rolling resistance, abrasion resistance, grip performance and fuel economy characteristics.

The effects of an aspect of the present specification are not limited to the above-mentioned effects, and it should be understood that the effects of the present specification include all effects that could be inferred from the configuration described in the detailed description of the specification or the appended claims.

BRIEF DESCRIPTION OF DRAWINGS

FIG. 1 schematically illustrates a method of manufacturing a functionalized processing aid according to an embodiment of the present specification.

BEST MODE FOR CARRYING OUT THE INVENTION

Hereinafter, an aspect of the present specification will be explained with reference to the accompanying drawing. The description of the present specification, however, may be modified in different ways, and should not be construed as limited to the embodiments set forth herein. Also, in order to clearly explain an aspect of the present specification in the drawing, portions that are not related to the explanation are omitted, and like reference numerals are used to refer to like elements throughout the specification.

Throughout the specification, it should be understood that when a portion is referred to as being "connected" to another portion, it can be "directly connected to" the other portion, or "indirectly connected to" the other portion having intervening portions present. Also, when a component "includes" an element, unless there is another opposite description thereto, it should be understood that the component does not exclude another element but may further include another element.

When a range of numerical values is described herein, the value has the precision of the significant figures provided according to the standard rules in chemistry for significant figures, unless a specific range thereof is stated otherwise. For example, 10 includes a range of 5.0 to 14.9 and the number 10.0 includes a range of 9.50 to 10.49.

Hereinafter, an embodiment of the present specification will be described in detail with reference to the accompanying drawing.

Rubber Composition for Tire Tread

A rubber composition for a tire tread according to an aspect of the present specification comprises: a rubber polymer; a petroleum resin; and a functionalized processing aid, wherein the functionalized processing aid is a bond of a silane-based compound and a cardanol-derived structure, represented by the following formula 1:

$$(R_1)_3Si-R_2-Z-(E)_n \quad \text{[Formula 1]}$$

wherein the $R_1$ is each independently a linear or branched alkyl group or alkoxyalkyl group having 1 to 10 carbon atoms, which may implement the effect of improving the compatibility between the functionalized processing aid and the reinforcing agent.

The $R_2$ is a structure linking a silane-based compound and a cardanol-derived structure, which may be a linear or branched alkylene group having 1 to 20 carbon atoms.

The Z is a structure derived from a nucleophilic end imparting reactivity to a silane-based compound with a compound derived from cardanol, for example, epoxidized cardanol, which may be nitrogen, sulfur or oxygen. Depending on the type of Z, n may be 1 or 2.

Cardanol is a raw material extracted from cashew nut, a natural material. The epoxidized cardanol may be cardanol glycidyl ether produced by the reaction of epichlorohydrin with the hydroxyl group (—OH) of cardanol, but is not limited thereto.

The E is each independently hydrogen or a cardanol-derived structure represented by the following formula 1-1, and at least one E may not be hydrogen.

[Formula 1-1]

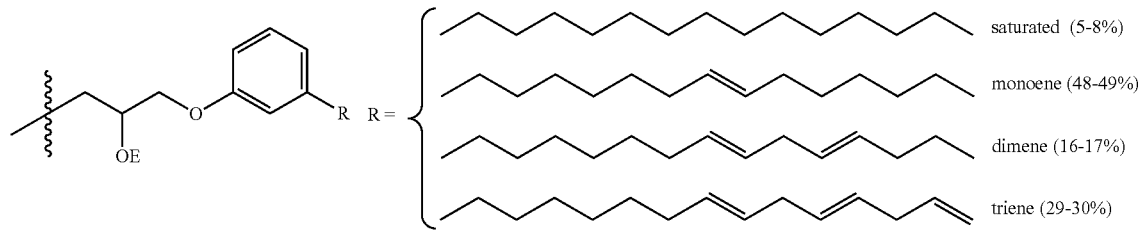

The cardanol-derived structure represented by formula 1-1 may comprise a —OE group so that an additional cardanol-derived structure may be linked thereto. The E may implement the effect of improving processability by imparting flexibility to the rubber composition. The R may be a structure derived from cardanol.

The rubber polymer may comprise at least one of a first polymer in which an aromatic vinyl monomer and a conjugated diene-based monomer are solution-polymerized and a second polymer in which a conjugated diene-based monomer is solution-polymerized, but is not limited thereto.

As used herein, the term "solution polymerization" refers to a method of dissolving one or more monomers using a specific type of solvent as a polymerization medium in the presence of a catalyst or an initiator and then polymerizing the monomers.

The solution polymerization may be carried out using, for example, one selected from the group consisting of an aliphatic hydrocarbon, a cyclic aliphatic hydrocarbon, an aromatic hydrocarbon and combinations of two or more thereof as a solvent. Examples of such a solvent may be one selected from the group consisting of n-pentane, n-hexane, n-heptane, isooctane, cyclohexane, toluene, benzene, xylene and combinations of two or more thereof, but are not limited thereto.

The aromatic vinyl monomer may be at least one selected from the group consisting of styrene, α-methylstyrene, 2-methylstyrene, 3-methylstyrene, 4-methylstyrene, 2,4-dimethylstyrene, 2,4-diisopropylstyrene, 4-propylstyrene, 4-cyclohexylstyrene, 4-(p-methylphenyl)styrene, 5-tert-butyl-2-methylstyrene, tert-butoxystyrene, 2-tert-butylstyrene, 3-tert-butylstyrene, 4-tert-butylstyrene, N,N-dimethylaminoethylstyrene, 1-vinyl-5-hexylnaphthalene, 1-vinylnaphthalene, divinylnaphthalene, divinylbenzene, trivinylbenzene, vinylbenzyldimethylamine, (4-vinylbenzyl)dimethylaminoethylether, vinylpyridine, vinylxylene, diphenylethylene, diphenylethylene comprising tertiary amines, and styrene comprising primary, secondary, or tertiary amines, but is not limited thereto.

The conjugated diene-based monomer may be at least one selected from the group consisting of 1,3-butadiene, isoprene, 2,3-dimethyl-1,3-butadiene, 1,3-pentadiene, 1,3-hexadiene, 2-phenyl-1,3-butadiene, 3-methyl-1,3-pentadiene, 2-chloro-1,3-butadiene, 3-butyl-1,3-octadiene and octadiene, but is not limited thereto.

For example, when the aromatic vinyl monomer is styrene and the conjugated diene-based monomer is 1,3-butadiene, the first polymer may be a styrene-butadiene rubber, but is not limited thereto.

As another example, when the conjugated diene-based monomer is 1,3-butadiene, the second polymer may be a polybutadiene rubber, for example, a high-cis polybutadiene rubber, a low-cis polybutadiene rubber, and a ultra high-cis polybutadiene rubber prepared with a neodymium-based catalyst, but is not limited thereto.

The rubber polymer may be modified with a compound comprising at least one of N, S, O and Si, but is not limited thereto. When the non-polar rubber polymer is terminally modified with the compound having polarity, the bonding force with a polar filler such as silica may be improved, and mechanical properties and fuel efficiency characteristics of the final product may be improved.

The rubber polymer may include the first polymer and the second polymer in a weight ratio of 10-200:10-200. The weight ratio of the first polymer and the second polymer may be adjusted according to the properties of the desired product.

As used herein, the term "petroleum resin" refers to a resin manufactured using a petroleum-derived byproduct as a raw material. The rubber composition for a tire tread according to an embodiment of the present specification may have improved abrasion resistance and improved braking performance of the tire, which is the final product, by using a petroleum resin, as compared to conventional rubbers for tire treads to which an extender oil is applied.

The petroleum resin may be at least one selected from the group consisting of a phenolic resin, a coumarone indene resin, an alpha-methylstyrene resin, a C5/C9 mixed petroleum resin, a C9 petroleum resin, a dicyclopentadiene resin and a hydrogenated dicyclopentadiene resin, but is not limited thereto.

The glass transition temperature (Tg) of the petroleum resin may be −30 to 100° C., for example, −30° C., −25° C., −20° C., −15° C., −10° C., −5° C., 0° C., 5° C., 10° C., 15° C., 20° C., 25° C., 30° C., 35° C., 40° C., 45° C., 50° C., 55° C., 60° C., 65° C., 70° C., 75° C., 80° C., 85° C., 90° C., 95° C., 100° C., or a value between any two values thereof, but is not limited thereto.

The softening point of the petroleum resin may be 20 to 150° C., for example, 20° C., 25° C., 30° C., 35° C., 40° C., 45° C., 50° C., 55° C., 60° C., 65° C., 70° C., 75° C., 80° C., 85° C., 90° C., 95° C., 100° C., 105° C., 110° C., 115° C., 120° C., 125° C., 130° C., 135° C., 140° C., 145° C., 150° C., or a value between any two values thereof, but is not limited thereto.

The petroleum resin may be a liquid petroleum resin or a solid petroleum resin, for example, may be a liquid petroleum resin existing in a liquid phase at room temperature, but is not limited thereto.

The petroleum resin may be used together with an extender oil or processing oil. The extender oil may be, for example, at least one selected from the group consisting of treated distillate aromatic extract oil (TDAE oil), mild extraction solvate oil (MES oil), residual aromatic extract oil (RAE oil) and heavy naphthenic oil, but is not limited thereto.

The content of the petroleum resin may be 5 to 50 parts by weight based on 100 parts by weight of the rubber polymer. For example, the content of the petroleum resin may be 5 parts by weight, 6 parts by weight, 8 parts by weight, 10 parts by weight, 12 parts by weight, 14 parts by weight, 16 parts by weight, 18 parts by weight, 20 parts by weight, 22 parts by weight, 24 parts by weight, 26 parts by weight. parts, 28 parts by weight, 30 parts by weight, 32 parts by weight, 34 parts by weight, 36 parts by weight, 38 parts by weight, 40 parts by weight, 42 parts by weight, 44 parts by weight, 46 parts by weight, 48 parts by weight, 50 parts by weight or a value between any two values thereof, but is not limited thereto. When the content of the petroleum resin is less than 5 parts by weight based on 100 parts by weight of the rubber polymer, it may be difficult to improve the braking performance or abrasion characteristics, and when it is greater than 50 parts by weight, the processability of the rubber composition and the rolling resistance, stability, etc., of the final product may deteriorate.

As used herein, the term "functionalized processing aid" refers to a processing aid functionalized by introducing a specific functional group into a processing aid which improves processability by improving the flexibility of rubber. The rubber composition for a tire tread according to an embodiment of the present specification uses a functionalized processing aid, thereby having improved processability and dispersibility of a reinforcing agent, and accordingly improving physical properties such as noise characteristics, abrasion resistance, grip performance and fuel economy characteristics of the tire, which is the final product.

The content of the functionalized processing aid may be 1 to 20 parts by weight based on 100 parts by weight of the rubber polymer. For example, the content of the functionalized processing aid may be 1 part by weight, 2 parts by weight, 3 parts by weight, 4 parts by weight, 5 parts by weight, 6 parts by weight, 7 parts by weight, 8 parts by weight, 9 parts by weight, 10 parts by weight, 11 parts by weight, 12 parts by weight, 13 parts by weight, 14 parts by weight, parts by weight, 16 parts by weight, 17 parts by weight, 18 parts by weight, 19 parts by weight, 20 parts by weight, or a value between any two values thereof, but is not limited thereto. When the content of the functionalized processing aid is less than 1 part by weight based on 100 parts by weight of the rubber polymer, the dispersibility of the reinforcing agent may deteriorate, thereby degrading the mechanical and dynamic properties and processability of the rubber composition, and when it is greater than 20 parts by weight, the mechanical properties of the final product may deteriorate.

The silane moiety of the functionalized processing aid may improve the dispersibility of the hydrophilic reinforcing agent by improving the miscibility with the silane-based additive of the rubber composition, and improve mechanical properties including rolling resistance and kinematic viscoelastic properties of the final product by improving the hydrogen bonding force with various hydrophilic functional groups on the surface of the reinforcing agent to impart hydrophilicity.

The silane-based compound is a silane compound having at least one silicon atom and at least one thiol group, amino group or alcohol group in a molecule. The silane-based compound may comprise a functional group capable of bonding with organic materials and inorganic materials to perform a role of improving the compatibility between organic materials and inorganic materials, thereby improving the mechanical strength of a composite material. For example, when a silane-based compound is introduced into a component of the rubber composition for a tire tread, the bonding force between rubber and the reinforcing agent may be improved, thereby improving mechanical strength, fuel efficiency characteristics and abrasion characteristics of the final product.

The silane-based compound may be an alkoxysilane compound, for example, aminoalkoxysilane, but is not limited thereto. The alkoxysilane compound may have at least one alkoxy group linked to a silicon element of the silane-based compound to be chemically bonded with an inorganic material such as glass, metal, or inorganic filler, etc. When the alkoxy group of the alkoxysilane compound is a methoxy group, hydrolysis may proceed rapidly. When it is an ethoxy group, hydrolysis may proceed relatively slowly and thus stability may be excellent. As the number of alkoxy groups increases, the reactivity and crosslinking density are improved, thereby forming a strong bond with the inorganic material.

The silane compound may be at least one selected from the group consisting of 1-(trimethoxysilyl)methanamine, 1-(triethoxysilyl)methanamine, 2-(trimethoxysilyl) ethanamine, 2-(triethoxysilyl)ethanamine, 3-aminopropyltrimethoxysilane, 3-aminopropyltriethoxysilane, 4-aminobutyltrimethoxysilane, 4-aminobutyltriethoxysilane, 3-aminopropylmethyldimethoxysilane, 3-aminopropylmethyldiethoxysilane, 3-aminopropylethyldimethoxysilane, 3-aminopropylethyldiethoxysilane, 3-aminopropyldimethylmethoxysilane, 3-aminopropyldimethylethoxysilane, 3-aminopropyldiethylmethoxysilane, 3-aminopropyldiethylethoxysilane, N-(2-aminoethyl)-3-aminopropylmethyldimethoxysilane, N-2-(aminoethyl)-3-aminopropylmethyldimethoxysilane, N-2-(aminoethyl)-3-aminopropyltrimethoxysilane, N-(3-(trimethoxysilyl]propyl)butylamine, diethylenetriaminepropyltrimethoxysilane, diethylaminomethyltriethoxysilane, N-phenyl-3-aminopropyltrimethoxysilane, (N-phenylamino)methyltriethoxysilane and N-(3-aminopropyl)cyclohexanamine, for example, 3-aminopropyltriethoxysilane, but is not limited thereto.

The silane-based compound may be at least one selected from the group consisting of 1-(trimethoxysilyl)methanethiol, 1-(triethoxysilyl)methanethiol, 2-(trimethoxysilyl) ethanethiol, 2-(triethoxysilyl)ethanethiol, 3-mercaptopropyltrimethoxysilane, 3-mercaptopropyltriethoxysilane, 4-mercaptobutyltrimethoxysilane, 4-mercaptobutyltriethoxysilane, 3-mercaptopropylmethyldimethoxysilane, 3-mercaptopropylmethyldiethoxysilane, 3-mercaptopropylethyldimethoxysilane, 3-mercaptopropylethyldiethoxysilane, 3-mercaptopropyldimethylmethoxysilane, 3-mercaptopropyldimethylethoxysilane, 3-mercaptopropyldiethylmethoxysilane and 3-mercaptopropyldiethylethoxysilane, for example, 3-mercaptopropyltriethoxysilane, but is not limited thereto.

The silane-based compound may be at least one selected from the group consisting of 3-glycidoxypropylmethyldimethoxysilane, 3-glycidoxypropyltrimethoxysilane, 3-glycidoxypropylmethyldiethoxysilane, 3-glycidoxypropyltriethoxysilane, 2-(3,4epoxycyclohexyl)ethyltrimethoxysilane and 2-(3,4epoxycyclohexyl)ethyltriethoxysilane, for example, 2-(3,4epoxycyclohexyl)ethyltrimethoxysilane, but is not limited thereto.

The cardanol-derived structure may include a double bond capable of participating in crosslinking in the vulcanization step of the rubber composition to improve vulcanization with rubber. In addition, the cardanol-derived structure comprises a phenyl group and a hydrocarbon, and exhibits hydrophobicity. Thus, processability with rubber may be increased, and miscibility with a silane-based additive may be improved, thereby improving the dispersibility of the hydrophilic reinforcing agent.

The molar ratio of the silane-based compound and the cardanol-derived structure may be 1:2 to 8. For example, the cardanol-derived structure may be bonded in a ratio of 2 moles, 3 moles, 4 moles, 5 moles, 6 moles, 7 moles, 8 moles, or a value between two or more values thereof per 1 mole of the silane-based compound, but the molar ratio is not limited thereto.

When the ratio of the cardanol-derived structure is excessively low, it may be difficult to improve the processability of the rubber composition, and when it is excessively high, the effect of improving compatibility with the reinforcing agent may be insignificant.

By replacing at least a portion of the extender oil content included in the conventional rubber composition, the petroleum resin and functionalized processing aid according to an embodiment of the present specification may maintain the effect of improving processability achieved by the use of the extender oil, prevent the problems caused by the use of the extender oil such as generation of volatile organic compounds, blooming, etc., and improve mechanical properties and kinematic viscoelastic properties of the rubber composition.

The rubber composition for a tire tread may further comprise a conventional additive used in a general rubber composition for a tire tread.

Method of Manufacturing Rubber Composition for Tire Tread

A method of manufacturing a rubber composition for a tire tread according to another aspect of the present specification may comprise: (a) preparing a rubber polymer by solution-polymerizing a monomer mixture comprising a conjugated diene-based monomer; and (b) adding a petroleum resin and a functionalized processing aid to the rubber polymer and mixing the same, wherein the functionalized processing aid is a bond of a silane-based compound and a cardanol-derived structure, represented by the following formula 1:

$$(R_1)_3Si-R_2-Z-(E)_n$$ [Formula 1]

wherein $R_1$ is each independently a linear or branched alkyl group or alkoxyalkyl group having 1 to 10 carbon atoms, $R_2$ is a linear or branched alkylene group having 1 to 20 carbon atoms, Z is nitrogen, sulfur or oxygen, and E is each independently hydrogen or a cardanol-derived structure represented by the following formula 1-1:

[Formula 1-1]

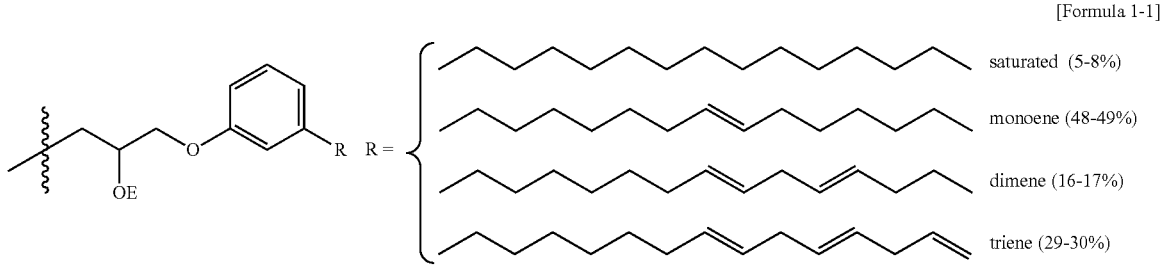

wherein at least one E is not hydrogen, and n is 1 or 2.

The rubber polymer, petroleum resin, functionalized processing aid, and their contents may be the same as those of the above-described rubber composition for a tire tread.

Step (a) is a step of preparing a rubber polymer by solution-polymerizing a monomer mixture comprising a conjugated diene-based monomer, wherein the monomer mixture may further comprise an aromatic vinyl monomer.

Step (a) may comprise the steps of: (a1) solution-polymerizing an aromatic vinyl monomer and a conjugated diene-based monomer; (a2) solution-polymerizing a conjugated diene-based monomer; and (a3) mixing the product of step (a1) and the product of step (a2).

Step (b) is a step of adding a petroleum resin and a functionalized processing aid to the rubber polymer and mixing the same, wherein a conventional additive used in a general rubber composition for a tire tread may be additionally added.

In step (b), the rubber polymer may be a solid rubber or a rubber solution comprising a solution-polymerized rubber polymer, but is not limited thereto.

The functionalized processing aid may be manufactured by reacting a mixture of a silane-based compound, an epoxidized cardanol and a solvent in the presence of a base.

The base may be at least one selected from the group consisting of hydrides, hydroxides, carbonates, bicarbonates and amines of alkali metals or alkaline earth metals, but is not limited thereto. The base may promote the reaction of the epoxidized cardanol.

The epoxidized cardanol may be added in excess compared to the silane-based compound. For example, 2 to 8 moles may be added based on 1 mole of the silane-based compound to form at least two to eight cardanol-derived structures, but the present specification is not limited thereto.

The solvent may be a polar organic solvent capable of increasing the solubility of a reactant, and, for example, may be at least one selected from the group consisting of ethanol, dimethylformaldehyde and tetrahydrofuran, but is not limited thereto.

The mixture of the silane-based compound, epoxidized cardanol and solvent may be manufactured at room temperature in consideration of the reactivity of the epoxidized cardanol, and the step of manufacturing a functionalized processing aid by reacting the mixture may be performed at a temperature of 20 to 100° C., but the present specification is not limited thereto.

Hereinafter, examples of the present specification will be described in more detail. However, the following experimental results describe only representative experimental results among the above examples and the scope and content of the present specification may not be construed as narrowed or limited by the examples. Each effect of the various embodiments of the present specification not explicitly presented below will be specifically described in the corresponding section.

FIG. 1 illustrates an example of a method of manufacturing a functionalized processing aid described in the present specification. According to FIG. 1, a functionalized processing aid mixture in which a silane-based compound and a cardanol-derived structure are bonded in various molar ratios may be manufactured by a nucleophilic ring opening chain reaction.

Referring to FIG. 1, the functionalized processing aid may be manufactured by introducing an epoxy functional group into cardanol derived from a natural material, and then reacting it with a nucleophilic end located at the end of the alkyl chain of a silane-based compound.

Preparation Example 1-1

Epichlorohydrin (670 g, 3.0 eq) was added to cardanol (720 g, 1.0 eq) in a reactor, and 40% NaOH (337.7 g, 1.0 eq) was added dropwise for 90 minutes until the reaction temperature was raised from 20° C. to 70° C. After the dropwise addition of NaOH had been completed, the reaction was continued for 2 hours while maintaining the reaction temperature of the reactant at 55 to 60° C. to obtain a solution containing epoxidized cardanol. The solution was analyzed by gas chromatography (GC) and it was confirmed that the composition comprises unreacted cardanol 1.2%, epoxidized cardanol 85.9%, 2-methyl-cardol glycidyl ether 4.2%, cardol diglycidyl ether 4.7% and dimer 3.6%.

Thereafter, the obtained solution was filtered to remove sodium chloride salt. The filtrate was poured into a separatory funnel, and then the layers were separated for 1 hour. The separated lower layer was removed, and the upper layer was put into a reactor and concentrated under reduced pressure at 120° C. to remove moisture and unreacted epichlorohydrin. The concentrate was filtered to remove the sodium chloride salt to obtain epoxidized cardanol.

The epoxidized cardanol and 3-aminopropyltriethoxysilane were added to an ethanol solvent. N-butyllithium was added to the reactant, and the temperature was raised to 60° C. The reaction was performed for 6 hours to obtain a functionalized processing aid.

As a result of additional experiments, the functionalized processing aid could be manufactured at a reaction temperature of 20 to 100° C., and could be manufactured using hydrides, hydroxides, carbonates, bicarbonates and amines of alkali metals and alkaline earth metals as a catalyst. In addition, when a polar organic solvent having high solubility of the reactant such as ethanol, dimethylformaldehyde or tetrahydrofuran was used as a reaction solvent, the reaction proceeded more smoothly.

It was confirmed that in the functionalized processing aid, 2 to 8 moles of cardanol were bonded per 1 mole of the silane-based compound.

Preparation Example 1-2

A functionalized processing aid was manufactured in the same manner as in Preparation Example 1-1, except that 3-mercaptopropyltriethoxysilane was used instead of 3-aminopropyltriethoxysilane.

Preparation Example 1-3

A functionalized processing aid was manufactured in the same manner as in Preparation Example 1-1, except that 2-(3,4epoxycyclohexyl)ethyltrimethoxysilane was used instead of 3-aminopropyltriethoxysilane.

Preparation Example 2

After feeding 42 g of styrene, 153.5 g of 1,3-butadiene, 1,200 g of cyclohexane and 5 mL of tetrahydrofuran to a 5 L reactor, the internal temperature of the reactor was adjusted to 35° C. while stirring. When the internal temperature of the reactor reached 35° C., 1.2 mmol of n-butyllithium, a polymerization initiator, was added, and an adiabatic temperature rising reaction proceeded. When the reaction temperature reached the peak, 4.5 g of 1,3-butadiene was additionally fed to substitute butadiene for the reaction end, and then 1.4 mmol of 3-aminopropyltriethoxysilane, a terminal modifier, was added and left for a certain period of time. Thereafter, 2 g of butylated hydroxyl toluene, an antioxidant, was added to terminate the reaction and obtain a styrene-butadiene rubber solution. 67.5 g of a C9 liquid petroleum resin having a viscosity of 10,000 cps and a glass transition temperature of −4° C. at 60° C. (Kolon Industries, DLP-2) and 7.5 g of the functionalized processing aid of Preparation Example 1-1 were added to a rubber solution comprising 200 g of the styrene-butadiene rubber solution and 1,200 g of cyclohexane. After stirring for a sufficient time so that the liquid petroleum resin and the functionalized processing aid were completely dispersed in the rubber solution, steam was added to remove the solvent and obtain a solidified rubber composition by roll-drying.

Examples and Comparative Examples

A rubber composition compounded according to the conditions of Table 1 below was manufactured in a 500 cc lab mixer. The functionalized processing aid of Preparation Example 1-1 was used, and liquid petroleum resin DLP-2 of Kolon Corporation was used as a petroleum resin.

In Example 7, the rubber composition (Pre mixing SSBR) of Preparation Example 2 in which a liquid petroleum resin and a functionalized processing aid were mixed in advance in a styrene-butadiene rubber solution to be solidified, was used.

Comparative Example 1 used only TDAE oil without a liquid petroleum resin and a functionalized processing aid at the time of compounding, and Comparative Example 2 replaced TDAE oil with a liquid petroleum resin and used the same without a functionalized processing aid.

TABLE 1

| Composition (phr) | Comp. Example 1 | Comp. Example 2 | Example 1 | Example 2 | Example 3 | Example 4 | Example 5 | Example 6 | Example 7 |
|---|---|---|---|---|---|---|---|---|---|
| Solution SBR | 80.00 | 80.00 | 80.00 | 80.00 | 80.00 | 80.00 | 80.00 | 80.00 | 0.00 |
| Pre mixing SSBR | 0.00 | 0.00 | 0.00 | 0.00 | 0.00 | 0.00 | 0.00 | 0.00 | 110.00 |
| NdBR | 20.00 | 20.00 | 20.00 | 20.00 | 20.00 | 20.00 | 20.00 | 20.00 | 20.00 |
| X50S | 12.80 | 12.80 | 12.80 | 12.80 | 12.80 | 12.80 | 12.80 | 12.80 | 12.80 |
| Silica | 80.00 | 80.00 | 80.00 | 80.00 | 80.00 | 80.00 | 80.00 | 80.00 | 80.00 |
| TDAE oil | 30.00 | 0.00 | 0.00 | 0.00 | 0.00 | 0.00 | 0.00 | 0.00 | 0.00 |
| Functionalized processing aid | 0.00 | 0.00 | 1.00 | 2.00 | 3.00 | 4.00 | 5.00 | 6.00 | 0.00 |
| Petroleum resin | 0.00 | 30.00 | 29.00 | 28.00 | 27.00 | 26.00 | 25.00 | 24.00 | 0.00 |
| Zinc oxide | 3.00 | 3.00 | 3.00 | 3.00 | 3.00 | 3.00 | 3.00 | 3.00 | 3.00 |
| 6PPD | 3.00 | 3.00 | 3.00 | 3.00 | 3.00 | 3.00 | 3.00 | 3.00 | 3.00 |
| Stearic acid | 2.00 | 2.00 | 2.00 | 2.00 | 2.00 | 2.00 | 2.00 | 2.00 | 2.00 |
| Sulfur | 1.50 | 1.50 | 1.50 | 1.50 | 1.50 | 1.50 | 1.50 | 1.50 | 1.50 |
| CBS | 1.80 | 1.80 | 1.80 | 1.80 | 1.80 | 1.80 | 1.80 | 1.80 | 1.80 |
| DPG | 1.80 | 1.80 | 1.80 | 1.80 | 1.80 | 1.80 | 1.80 | 1.80 | 1.80 |

Solution SBR: SOL5251H (Kumho Petrochemical)
NdBR: NdBR40 (Kumho Petrochemical)
X50S: S 50-S (Evonik Industries)
Petroleum resin: C9 liquid resin DLP-2 (Kolon Industries)
CBS: N-cyclohexylbenzothiazyl sulfenamide
DPG: 1,3-diphenyl guanidine Processability, mechanical properties and dynamic properties of each rubber composition manufactured according to the above Examples and Comparative Examples were measured, and the results are shown in Table 2 below. The method of measuring each physical property is as follows.

Compound Mooney Viscosity: An unvulcanized compound was attached to the front and rear of a rotor, and mounted on a rotary viscometer (ALPHA Technologies, MOONEY MV2000). After preheating to 100° C. for an initial 1 minute, the rotor was started and the viscosity change of the compound was measured for 4 minutes to measure the compound Mooney viscosity expressed as $ML_{1+4}$@100° C.

Hardness: measured using a SHORE-A hardness machine.

Tensile strength, 300% modulus and elongation: measured using a Universal Test Machine (UTM) according to ASTM 3189 Method B.

Abrasion: measured by directly contacting a specimen with a grinding stone using a Lambourn abrasion tester.

Dynamic property value of vulcanized rubber (Tan δ): analyzed using a DMTA 5 instrument from Rheometic Co., Ltd. at a frequency of 10 Hz and a deformation condition of 0.2.

Payne (ΔG'): The degree of dispersion of silica was confirmed by measuring the difference in G' value between 0.28 and 40% strain at 60° C. using a measuring instrument (ALPHA Technologies, RPA2000).

TABLE 2

| | Comp. Example 1 | Comp. Example 2 | Example 1 | Example 2 | Example 3 | Example 4 | Example 5 | Example 6 | Example 7 |
|---|---|---|---|---|---|---|---|---|---|
| Compound Mooney Viscosity (@100° C.) | 85 | 107 | 104 | 103 | 99 | 95 | 91 | 85 | 101 |
| Hardness (SHORE-A) | 72 | 77 | 77 | 76 | 76 | 75 | 74 | 74 | 77 |
| 300% modulus (kgf/cm$^2$) | 141 | 160 | 157 | 155 | 152 | 148 | 147 | 143 | 155 |
| Tensile strength (kgf/cm$^2$) | 204 | 231 | 228 | 235 | 239 | 245 | 238 | 249 | 242 |
| Elongation (%) | 394 | 397 | 406 | 412 | 386 | 409 | 375 | 384 | 385 |
| Abrasion (g) | 0.1874 | 0.1308 | 0.1305 | 0.1296 | 0.1285 | 0.1268 | 0.1258 | 0.1242 | 0.1205 |
| Tg (° C.) | −45.4 | −30.5 | −31.2 | −31.9 | −32.0 | −32.2 | −32.5 | −33.0 | −31.8 |
| Tan δ at 0° C. | 0.1754 | 0.2644 | 0.2499 | 0.2501 | 0.2642 | 0.2734 | 0.2711 | 0.2762 | 0.2720 |
| Tan δ at 60° C. | 0.0852 | 0.1176 | 0.1161 | 0.1147 | 0.1124 | 0.1087 | 0.0986 | 0.0956 | 0.0984 |
| Payne (ΔG', kpa) | 553 | 577 | 567 | 500 | 469 | 435 | 427 | 411 | 405 |

Referring to Table 2 above, it may be confirmed that in Comparative Example 2, in which TDAE oil was replaced with liquid petroleum resin DLP-2, the compound Mooney viscosity increased compared to Comparative Example 1, but in Examples 1 to 7 which include a functionalized processing aid together with a liquid petroleum resin, the Mooney viscosity is lower than Comparative Example 2, and thus processability improved.

Examples 1 to 7 had lower hardness than Comparative Example 2, so that the noise characteristics of the final product can be improved, and had excellent physical properties such as 300% modulus and tensile strength. This is determined to be because the silane group introduced into the functionalized processing aid participated in the cross-linking process of the rubber composition. It was indirectly confirmed that the functionalized processing aid can increase the strength of rubber by increasing the crosslinking density with sulfur when compounding the rubber composition.

Comparative Example 2, in which TDAE oil was replaced with liquid petroleum resin DLP-2, had significantly improved abrasion resistance compared to Comparative Example 1, and Examples 1 to 7 which include a functionalized processing aid together with a liquid petroleum resin exhibited more excellent abrasion resistance than Comparative Examples 1 and 2.

The tan δ value at 0° C. was remarkably excellent in Comparative Example 2 which includes a liquid petroleum resin, compared to Comparative Example 1 which uses TDAE oil. Examples 1 to 7 which include a functionalized processing aid together with a liquid petroleum resin exhibited more excellent results than Comparative Example 1. Accordingly, it was confirmed that the wet grip performance and stability of the tire using the rubber composition comprising a liquid petroleum resin were excellent.

The tan δ at 60° C. and Payne values of Comparative Example 2 deteriorated compared to Comparative Example 1 according to the use of a liquid petroleum resin, but the rolling resistance and Payne values of Examples 1 to 7 were lower than those of Comparative Example 2. Accordingly, it was confirmed that the dispersibility of the reinforcing agent in the rubber composition and the fuel efficiency characteristics of the tire were improved by including a functionalized processing aid.

In particular, as the content of the functionalized processing aid increased, the Mooney viscosity, hardness, abrasion, tan δ° C. and Payne value decreased. Accordingly, it was confirmed that the processability, noise characteristics, abrasion resistance, fuel efficiency characteristics and dispersibility of the reinforcing agent of the rubber composition improved as the content of the functionalized processing aid increases.

The foregoing description of the present specification has been presented for illustrative purposes, and it is apparent to a person having ordinary skill in the art that the present specification can be easily modified into other detailed forms without changing the technical idea or essential features of the present specification. Therefore, it should be understood that the forgoing embodiments are by way of example only, and are not intended to limit the present specification. For example, each component which has been described as a unitary part can be implemented as distributed parts. Likewise, each component which has been described as distributed parts can also be implemented as a combined part.

The scope of the present specification is presented by the accompanying claims, and it should be understood that all changes or modifications derived from the definitions and scopes of the claims and their equivalents fall within the scope of the present specification.

What is claimed is:

1. A rubber composition for a tire tread, comprising:
a rubber polymer;
a petroleum resin; and
a functionalized processing aid,
wherein the functionalized processing aid is a bond of a silane-based compound and a cardanol-derived structure, represented by the following formula 1:

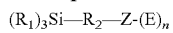  [Formula 1]

wherein $R_1$ is each independently a linear or branched alkyl group or alkoxyalkyl group having 1 to 10 carbon atoms, $R_2$ is a linear or branched alkylene group having 1 to 20 carbon atoms, Z is nitrogen, sulfur or oxygen, and E is each independently hydrogen or a cardanol-derived structure represented by the following formula 1-1:

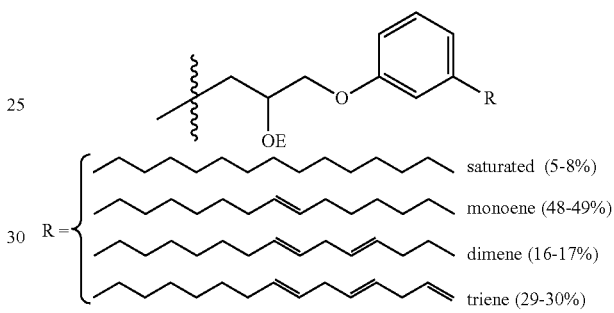

wherein at least one E is not hydrogen, and
n is 1 or 2,
wherein the molar ratio of the silane-based compound and the cardanol-derived structure is 1:2 to 8.

2. The rubber composition of claim 1, wherein the rubber polymer comprises at least one of a first polymer in which an aromatic vinyl monomer and a conjugated diene-based monomer are solution-polymerized and a second polymer in which a conjugated diene-based monomer is solution-polymerized.

3. The rubber composition of claim 1, wherein the petroleum resin is at least one selected from the group consisting of a phenolic resin, a coumarone indene resin, an alpha-methylstyrene resin, a C5/C9 mixed petroleum resin, a C9 petroleum resin, a dicyclopentadiene resin and a hydrogenated dicyclopentadiene resin.

4. The rubber composition of claim 1, wherein the content of the petroleum resin is 5 to 50 parts by weight based on 100 parts by weight of the rubber polymer.

5. The rubber composition of claim 1, wherein the content of the functionalized processing aid is 1 to 20 parts by weight based on 100 parts by weight of the rubber polymer.

* * * * *